(12) United States Patent
Jeol et al.

(10) Patent No.: US 10,611,882 B2
(45) Date of Patent: Apr. 7, 2020

(54) STABILIZED POLYAMIDE

(75) Inventors: Stephane Jeol, Cumming, GA (US); Thierry Badel, Lyons (FR)

(73) Assignee: Performance Polyamides, SAS, Paris (FR)

( * ) Notice: Subject to any disclaimer, the term of this patent is extended or adjusted under 35 U.S.C. 154(b) by 783 days.

(21) Appl. No.: 14/110,884

(22) PCT Filed: Apr. 12, 2012

(86) PCT No.: PCT/EP2012/056604
§ 371 (c)(1),
(2), (4) Date: Apr. 2, 2014

(87) PCT Pub. No.: WO2012/140100
PCT Pub. Date: Oct. 18, 2012

(65) Prior Publication Data
US 2014/0205783 A1 Jul. 24, 2014

(30) Foreign Application Priority Data
Apr. 13, 2011 (FR) ..................................... 11 01125

(51) Int. Cl.
*C08G 69/26* (2006.01)
*C08G 69/28* (2006.01)
*C08G 69/00* (2006.01)
*C08L 77/06* (2006.01)
*C08K 5/053* (2006.01)
*C08L 77/00* (2006.01)
*C08G 69/48* (2006.01)

(52) U.S. Cl.
CPC ............. *C08G 69/28* (2013.01); *C08G 69/00* (2013.01); *C08G 69/26* (2013.01); *C08G 69/48* (2013.01); *C08K 5/053* (2013.01); *C08L 77/00* (2013.01); *C08L 77/06* (2013.01); *Y10T 428/139* (2015.01); *Y10T 428/1397* (2015.01)

(58) Field of Classification Search
CPC ......... C08K 5/053; C08L 77/06; C08L 77/12; C08L 77/02; C08L 79/08
See application file for complete search history.

(56) References Cited

U.S. PATENT DOCUMENTS

| | | | | |
|---|---|---|---|---|
| 3,160,611 A | * | 12/1964 | Runge | .................... C08G 69/44 525/420 |
| 4,380,622 A | * | 4/1983 | Chiba | .................... C08G 69/44 528/272 |
| 6,160,080 A | | 12/2000 | Cucinella et al. | |
| 6,525,166 B1 | | 2/2003 | Di Silvestro et al. | |
| 2008/0146704 A1 | * | 6/2008 | Kumaraswamy | ...... C08K 5/053 524/101 |
| 2009/0149590 A1 | * | 6/2009 | Eroshov | ................. C08G 69/14 524/417 |
| 2010/0029819 A1 | | 2/2010 | Palmer et al. | |
| 2011/0028060 A1 | * | 2/2011 | Wakeman | .................. C08J 5/04 442/131 |
| 2012/0029134 A1 | * | 2/2012 | Doshi | .................. C08G 69/265 524/449 |

FOREIGN PATENT DOCUMENTS

| | | |
|---|---|---|
| FR | 1386182 A | 1/1965 |
| FR | 2043317 A5 | 2/1971 |
| JP | 61012728 A | 1/1986 |
| WO | 9724388 A1 | 7/1997 |
| WO | 9964496 A1 | 12/1999 |
| WO | 2007036929 A2 | 4/2007 |
| WO | WO 2007036929 A2 * 4/2007 ............. C08G 69/14 |

OTHER PUBLICATIONS

Standard ISO 11443, "Plastics—Determination of the Fluidity of Plastics Using Capillary and Slit-Die Rheometers—Second edition ", 2005, 34 pp.

* cited by examiner

*Primary Examiner* — Gregory Listvoyb
(74) *Attorney, Agent, or Firm* — Osha Liang LLP

(57) ABSTRACT

The present invention relates to the use of a polyhydric alcohol in a polyamide polymerization process for giving the modified polyamide obtained increased stability toward heat, light and/or bad weather. The invention also relates to a polyamide modified in this way, and also to polyamide compositions that may be used for the preparation of specific articles liable to be subjected to high temperatures.

6 Claims, No Drawings

STABILIZED POLYAMIDE

RELATED APPLICATIONS

This application is a U.S. national stage entry under 35 U.S.C. § 371 of International Application No. PCT/EP2012/056604, filed Apr. 12, 2012, which claims priority to French Application No. 11/01125 filed on Apr. 13, 2011. The entire contents of these applications are explicitly incorporated herein by this reference.

The present invention relates to the use of a polyhydric alcohol in a polyamide polymerization process for giving the modified polyamide obtained increased stability toward heat, light and bad weather. The invention also relates to a polyamide modified in this way, and also to polyamide compositions that may be used for the preparation of specific articles liable to be subjected to high temperatures.

PRIOR ART

Polyamide is a synthetic polymer widely used for the production of various articles, such as molded and/or injection-molded parts. Polyamide can undergo degradations when it is subjected to external elements or conditions such as UV rays, heat and/or inclement weather. Degradations can also be induced by the heat used during production thereof and/or forming thereof. This instability is reflected by degradations, loss of mechanical properties, and changes in color. These problems can become critical for a certain number of applications, such as, in particular, parts in the motor vehicle industry which are in particular subjected to considerable heat.

In order to improve the stability of polyamides toward to heat, it is known practice to combine them with particular stabilizers. Many additives are sold for this purpose. The use of copper iodide, in particular in combination with potassium iodide, which is used in most cases and which provides good stabilization properties, is, for example, known. It is also known practice to use more complex additives, such as hindered phenolic antioxidant compounds, stabilizers bearing at least one hindered amine unit of HALS type, or phosphorus-containing stabilizers.

However, there is a need to obtain polyamide compositions which are even more efficient in terms of stabilization toward heat, and which are less expensive.

It is known practice to add polyhydric alcohol during an extrusion step as a mixture with already-formed polyamide to obtain heat stabilization of the polyamide, as mentioned in document US 2010/0 029 819. However, the addition of polyhydric alcohols to the polyamide as a mixture remains a constraint insofar as an additional industrial step is necessary and any remelting of the polyamides after the manufacture thereof tends to degrade them and to reduce their intrinsic properties, especially for applications in yarns, fibers and films. Moreover, the polyhydric alcohols added in this manner are readily extractable over time and the performance of the formulations will thus have a tendency to decrease, and to do so all the more critically for applications in yarns, fibers and films having a large specific surface area.

It was moreover known practice to introduce polyhydric alcohol during the synthesis of the polyamide. This is especially what is performed in patent application WO 2007/036 929 to obtain increased melt fluidity for the polyamide.

There is thus a need to overcome these drawbacks while at the same time preserving the desired properties of the polyhydric alcohol in the polyamide. There is also a need to obtain polyamide compositions which are even more efficient in terms of stabilization toward heat, light and/or bad weather and which are less expensive.

Invention

The Applicant has demonstrated, entirely surprisingly, that the use of a polyhydric alcohol, in particular in which the alcohol functions are borne by aliphatic carbons, during a polyamide polymerization process gives the modified polyamide obtained increased stability toward heat, light and bad weather.

Advantageously, the polyhydric alcohol is an alcohol in which the alcohol functions are borne by aliphatic carbons, and is in particular an aliphatic alcohol, or even an alcohol comprising only saturated bonds.

Such a compound, when added during the polyamide polymerization, will make it possible to obtain modified polyamides in which the polyhydric alcohol may be found covalently bonded to the polyamide chains either by reaction with the end groups of carboxylic acid type or by reaction with the intracatenary amides. Such an effect on heat stabilization appears surprising insofar as it was known that the addition of a polyhydric alcohol during the polyamide synthesis would lead to the formation of ester functions with the carboxylic acid end groups of the polyamide, as explained especially in patent application WO 2007/036 929, which would bring about a substantial decrease in the free hydroxyl functions of the polyhydric alcohol and consequently in its capacity to act as a stabilizer. However, as observed in the experimental section, it is entirely the opposite which takes place, and strong retention of the mechanical properties after an aging test is noted.

The modified polyamide according to the invention to which a polyhydric alcohol is added during the polymerization makes it possible to obtain properties that are comparable or even superior to those of polyamide compositions comprising the polyhydric alcohol added as a mixture via a subsequent extrusion.

In particular, the covalent bonds may make it possible to reduce, limit or even prevent the phenomena leading to "washing" of the alcohol from the composition. This may be particularly useful in the case of parts that are in contact with hot liquids, such as parts in a cooling circuit.

It moreover appears that the addition of a polyhydric alcohol during the polyamide polymerization makes it possible to obtain a good distribution of said alcohol in the polyamide matrix, even when using small proportions. This is all the more advantageous insofar as it is generally difficult, during an introduction of a molecule such as a polyhydric alcohol by extrusion, to control perfectly the amount of molecule added, causing fluctuations in applicative performance, and necessitating the incorporation of a larger amount in order to be sure to have a minimum amount. It thus appears that uniform distribution of the polyhydric alcohol enables good efficacy of stabilization toward heat, light and bad weather, while at the same time using smaller proportions of additives; thus making it possible to avoid the use of an excessively large amount of additive, which may affect other properties, for instance the fluidity of the composition.

It furthermore appears that the use of a polyhydric alcohol during the polyamide polymerization makes it possible to avoid loss of the polyhydric alcohol. Specifically, it appears that when the latter is added in the melt, by extrusion, exudation is observed over time, bringing about deposition of the additive on the equipment, especially the feed hoppers, and fouling thereof.

A polyamide modified with at least one polyhydric alcohol according to the invention especially has a good compromise of rheological and mechanical properties that is adequate for numerous applications.

The present invention thus relates to the use of a polyhydric alcohol comprising at least three hydroxyl groups in a polyamide polymerization process to give the modified polyamide obtained increased stability, in particular over time, toward heat, light and/or bad weather. In particular, the use of a polyhydric alcohol comprising at least three hydroxyl groups in a polyamide polymerization process has a stabilizing effect toward aging caused by heat, light and/or bad weather, and in particular also acts as a gloss agent and/or antifouling agent, especially relative to an agent not used in synthesis. This may make it possible, for example, to avoid an increase in pressure of extrusion packs and thus improve the utilization of the equipment.

The invention also relates to polyamides that may be obtained via the use as described previously.

The present invention also relates to articles made for applications exposed to high temperatures, especially temperatures of greater than or equal to 80° C., more particularly temperatures of greater than or equal to 110° C. and more specifically temperatures of greater than or equal to 180° C., obtained by forming a composition comprising at least one polyamide obtained via a polymerization process in which the polyhydric alcohol is added during this polymerization.

From 0.05% to 20% by weight of polyhydric alcohol relative to the total weight of the polyamide, preferentially from 0.5% to 10% by weight, in particular from 1% to 5% by weight and especially from 1% to 4% by weight, is generally used.

From 0.05% to 20% by weight of polyhydric alcohol relative to the total weight of the composition, preferentially from 0.5% to 10% by weight, in particular from 1% to 4% by weight and especially from 1% to 3.5% by weight, is generally used.

The mole proportion of polyhydric alcohol compound covalently bonded to the polyamide is preferentially between 10% and 100% and more preferentially between 30% and 70%. The mole proportion of bonded polyhydric alcohol compound is especially calculated via the ratio of the number of moles of bonded polyhydric alcohol compound to the total number of moles of polyhydric alcohol compound.

The polyhydric alcohol preferentially contains from 3 to 9 hydroxyl groups, in particular 4, 6 or 8.

The polyhydric alcohols of the invention may be chosen from aliphatic, cycloaliphatic, arylaliphatic and aromatic compounds and may contain one or more heteroatoms, such as N, S, O and/or P. The polyhydric alcohols may contain one or more substituents such as ether, amine, carboxylic acid, amide or ester groups.

The polyhydric alcohol may also be a compound of formula (I) represented by the formula:

R—(OH)$_n$      (I)

in which:
n is between 3 and 8 and in particular is 4, 6, or 8,
R is a substituted or unsubstituted aliphatic, cycloaliphatic or arylalkyl hydrocarbon-based radical, optionally comprising heteroatoms such as N, S, O and/or P.

For the purposes of the present invention, the term "arylalkyl" means a radical R comprising at least one alkyl part and at least one aryl part, in which the alcohol functions are borne by alkyl carbons.

In particular, the alcohol functions, represented by —OH in formula (I), are borne by aliphatic carbons. In this case, the compound of formula (I) is therefore not a compound of phenol type.

R preferentially comprises from 2 to 20 carbon atoms and more preferentially from 4 to 10 carbon atoms.

The cycloaliphatic radical R may especially be cyclohexane.

The radical R may be substituted, for example, with various groups, for instance an amine function, a thiol function or a halogen, for instance Cl, F, Br or I.

R preferentially corresponds to a linear or branched hydrocarbon-based aliphatic chain optionally comprising heteroatoms such as N, S, O and/or P.

The polyhydric alcohol or the compound of formula (I) according to the invention may also comprise one or more functions, especially amines, such as primary, secondary and/or tertiary amines.

Advantageously, the aliphatic hydroxyl functions of the compounds of formula (I) are not hindered, i.e., for example, the carbon atoms alpha to the aliphatic hydroxyl function are preferably not substituted with bulky substituents, such as branched alkyls.

Polyhydric alcohols that may thus be mentioned include those mentioned in the group comprising: triols, for instance glycerol, trimethylolpropane, 2,3-bis(2'-hydroxyethyl)cyclohexan-1-ol, hexane-1,2,6-triol, 1,1,1-tris(hydroxymethyl)ethane, 3-(2'-hydroxyethoxy)propane-1,2-diol, 3-(2'-hydroxypropoxy)propane-1,2-diol, 2-(2'-hydroxyethoxy)hexane-1,2-diol, 6-(2'-hydroxypropoxy)hexane-1,2-diol, 1,1,1-tris[(2'-hydroxyethoxy)methyl]ethane, 1,1,1-tris[(2'-hydroxypropoxy)methyl]propane, 1,1,1-tris(4'-hydroxyphenyl)ethane, 1,1,1-tris(hydroxyphenyl)propane, 1,1,3-tris(dihydroxy-3-methylphenyl)propane, 1,1,4-tris(dihydroxyphenyl)butane, 1,1,5-tris(hydroxyphenyl)-3-methylpentane, di(trimethylolpropane), trimethylolpropane ethoxylate, or trimethylolpropane propoxylate; polyols, such as pentaerythritol, dipentaerythritol, and tripentaerythritol; and saccharides such as cyclodextrin, D-mannose, glucose, galactose, sucrose, fructose, xylose, arabinose, D-mannitol, D-sorbitol, D- or L-arabitol, xylitol, iditol, talitol, allitol, altritol, gulitol, erythritol, threitol and D-gulonic-γ-lactone; and similar compounds.

The preferred polyhydric alcohols include those which have at least one pair of hydroxyl groups of which the carbon atoms to which they are respectively bonded are separated by at least one atom, preferentially a carbon or oxygen atom.

Preferentially, the polyhydric alcohol used in the thermoplastic composition is diglycerol, triglycerol, pentaerythritol, dipentaerythritol, tripentaerythritol or di(trimethylolpropane). More preferentially, the polyhydric alcohol used is dipentaerythritol and/or tripentaerythritol.

According to one variant, the compound of formula (I) lacks an amine function, and in particular does not comprise any heteroatom such as N, S, O and/or P.

According to another variant, the compound of formula (I) may comprise an amine function. A compound of formula (I) that may be mentioned is tris(hydroxymethyl)aminomethane (RN CAS: 77-86-1) and/or a salt thereof.

Salts that may especially be mentioned include ammonium chlorides, ammonium bromides, ammonium sulfates, ammonium sulfonates, ammonium phosphates, and salts of carboxylic acid and of amine, for instance ammonium adipates, for instance the adipic acid salt of tris(hydroxymethyl)aminomethane.

The composition according to the invention may have:
an ultimate tensile strength retention of at least 92% and especially of at least 95% after 1000 h of aging at 170° C.

The composition according to the invention may have:
an ultimate tensile strength retention of at least 95% after 500 h of aging at 210° C., and/or
an ultimate tensile strength retention of at least 60% and especially of at least 65% after 1000 h of aging at 210° C.

The composition according to the invention may have:
an unnotched Charpy impact strength retention of at least 70%, especially of at least 80% or even of at least 85% after 1000 h of aging at 170° C.

The composition according to the invention may have:
an unnotched Charpy impact strength retention of at least 60%, especially of at least 80% and in particular of at least 90% after 500 h of aging at 210° C., and/or
an unnotched Charpy impact strength retention of at least 45%, especially of at least 55% and in particular of at least 65% after 1000 h of aging at 210° C.

In particular, the composition shows an improvement in the mean flow length, in particular according to the Spiral test, of at least 150% relative to a composition comprising an identical weight amount of DPE.

The ultimate tensile strength and the unnotched Charpy impact strength mentioned above are measured in accordance with the protocols presented in the examples.

The polyamide of the invention is especially chosen from the group comprising polyamides obtained via polycondensation of at least one aliphatic dicarboxylic acid with an aliphatic or cyclic or cycloaliphatic or arylaliphatic diamine, for instance PA 6.6, PA 6.10, PA 6.12, PA 10.10, PA 10.6, PA 12.12, PA 4.6, MXD6, PA 92, PA 102, or between at least one aromatic dicarboxylic acid and an aliphatic or aromatic diamine, for instance polyterephthalamides of the type such as PA 9T, PA 10T, PA 11T, PA 12T, PA 13T or PA 6T/MT, PA 6T/6I, PA 6T/66, PA 66/6T, polyisophthalamides of the type such as PA 6I, PA 6I/6T, polynaphthalamides of the type such as PA 10N, PA 11N, PA 12N, polyaramides such as Kevlar, or a blend thereof and (co)polyamides thereof. The polyamide of the invention may also be chosen from polyamides obtained via polycondensation of at least one amino acid or lactam with itself, it being possible for the amino acid to be generated by hydrolytic opening of a lactam ring, for instance PA 6, PA 7, PA 11, PA 12 or PA 13, or a blend thereof and (co)polyamides thereof. Types of copolyamide that may especially be mentioned include polyamide 6/66, polyamide 6/11, polyamide 6/12 and polyamide 11/12.

The diamines and diacids may bear heteroatoms. Mention may be made of 5-hydroxyisophthalic acid, 5-sulfoisophthalic acid or salts thereof for instance the lithium, sodium or zinc salts.

Semicrystalline aliphatic or semiaromatic polyamides are especially preferred.

Polyamides of type 6, of type 610, of type 66 and of type 66/6T are particularly preferred.

In general, the polyamide is a semicrystalline polyamide with an apparent melt viscosity of between 0.5 and 1200 Pa·s, measured according to standard ISO 11443 at a shear rate of 1000 s$^{-1}$ at a temperature equal to 20° C. above the melting point of the polyamide, and preferentially between 0.5 and 500 Pa·s.

Use may especially be made of polyamides of variable molecular weights by addition, before or during the polymerization of the polyamide monomers, or else in melt extrusion, of monomers that modify the length of the chains such as, in particular, difunctional and/or monofunctional compounds bearing amine or carboxylic acid functions that are capable of reacting with the polyamide monomers or the polyamide.

The term "carboxylic acid" means carboxylic acids and derivatives thereof, for instance acid anhydrides, acid chlorides and esters. The term "amine" means amines and derivatives thereof that are capable of forming an amide bond.

It is possible to use, at the start of, during or at the end of the polymerization, any type of aliphatic or aromatic monocarboxylic or dicarboxylic acid or any type of aliphatic or aromatic monoamine or diamine amine.

Use may very particularly be made of a polyamide obtained at least from adipic acid and hexamethylenediamine or salts thereof such as hexamethylenediamine adipate, which can optionally comprise various proportions of other polyamide monomers. To this end, polyamides 66/6T, containing various molar amounts of terephthalic acid monomer, may be mentioned.

The polyamide may especially be a copolyamide derived especially from the above polyamides, or blends of these polyamides or (co)polyamides.

Use may also be made of branched polyamides of high fluidity, in particular obtained by blending, during polymerization, in the presence of the polyamide monomers, at least one multifunctional compound comprising at least 3 identical reactive functions of amine function or carboxylic acid function type.

Use may also be made, as polyamide of high fluidity, of a star polyamide comprising star macromolecular chains and, if appropriate, linear macromolecular chains. Polymers comprising such star macromolecular chains are described, for example, in documents WO 97/24388 and WO 99/64496.

These star polyamides are in particular obtained by blending, during polymerization, in the presence of the polyamide monomers, an amino acid or lactam such as caprolactam, at least one multifunctional compound comprising at least 3 identical reactive functions of amine function or carboxylic acid function type. The term "carboxylic acid" means carboxylic acids and derivatives thereof, for instance acid anhydrides, acid chlorides and esters. The term "amine" means amines and derivatives thereof capable of forming an amide bond.

The polyhydric alcohol of the invention is thus added during the polyamide polymerization. Melt polymerization is especially preferred, which is performed in the liquid state, with a polymerization medium optionally containing no solvent other than water. The polymerization medium may for example be an aqueous solution comprising the monomers, or a liquid comprising the monomers.

The addition during polymerization generally leads to the formation of covalent bonds between the polyhydric alcohol and the polyamide. These covalent bonds may especially make it possible to reduce, limit or even prevent the phenomena leading to "washing" of the polyhydric alcohol from the composition. This may be particularly useful in the case of parts that are in contact with hot liquids, such as parts in a cooling circuit.

The polyamide polymerization according to the process of the invention is especially performed under standard polyamide polymerization operating conditions. The polyamide polymerization may be performed under conditions entirely similar to a polymerization in the absence of polyhydric alcohol.

According to another of its aspects, a subject of the invention is thus a polyamide polymerization process, comprising a step of placing the polyamide precursors in contact with the polyhydric alcohol under conditions, especially of temperature and pressure, which allow polymerization of the polyamide, followed by its recovery. Said precursors may be polyamide monomers, salts, oligomers and/or prepolymers.

Such a polymerization process may comprise, in brief:
a) heating of the mixture of monomers of the polyamide with stirring and under pressure; and
b) maintenance of the mixture under pressure and temperature for a given time, with removal of steam by means of a suitable device, followed by decompression and maintenance for a given time at a temperature above the melting point of the mixture, especially under nitrogen or under vacuum, in order thus to continue the polymerization by removal of the water formed.

The polymerizations starting from dicarboxylic acid monomers and diamine monomers generally comprise three stages. The first stage is the concentrating of a di(ammonium carboxylate) salt in water, known as "N salt". This step is followed by an amidation, which is a condensation of the acid and amine functions, generally comprising the following phases: a phase of distillation under pressure and a decompression phase. The condensation is subsequently continued at atmospheric pressure or under vacuum, until the desired degree of polymerization is achieved. This stage is referred to as the finishing stage. The polyamide is generally subsequently extruded and then granulated in a granulation phase.

The polymerisations starting with lactams and amino acids, in particular the manufacture of polyamide 6, may comprise a step of mixing the monomers with water, a heating step, optionally a step of increasing the pressure followed by a decompression step, optionally a step of finishing under vacuum, generally a step of granulation of the product obtained, an extraction step and a drying step.

The polyhydric alcohol may be introduced before the start of the step of concentrating the "N salt", for polyamide 66, or the step of mixing the monomers with water, for polyamide 6, and before the end of the finishing step. It is especially preferred to add the polyhydric alcohol to the mixture of monomers constituting the polyamide. This polyhydric alcohol may also be introduced after the phase of distillation under pressure, preferably after the decompression phase. The polyhydric alcohol may also be introduced between the start and the end of the finishing step.

The process for the polymerization of the polyamide can be continuous or batchwise.

In the case of a continuous process, the decompression phase is carried out by passing through a flasher, and the polyhydric alcohol may be introduced at the inlet of the flasher, especially at the start of the decompression step by passing through the flasher.

In the case of a batch process, it is preferred to add the polyhydric alcohol with the mixture of monomers of the polyamide.

The polyhydric alcohol may be added at the start, in the middle or at the end of the polyamide polymerization, and in the presence or absence of an amount of diamine or diacid to ensure perfect stoichiometry of the reactive functions. This adjustment of the stoichiometry especially makes it possible to modulate the size of the chain of the modified polyamide.

The stabilizer of polyhydric alcohol type of the invention may bond chemically with the amine and/or carboxylic acid functions of the polyamide or monomers of the polyamide.

The polyhydric alcohol may be added at the end of polymerization, or "late" addition, which makes it possible to limit the number of reactions of said alcohol with the polyamide chains or the polyamide monomers. The polyhydric alcohol thus remains predominantly in free form in the polyamide, i.e. not bonded via a covalent bond.

The polyhydric alcohol may thus be added to the reaction medium during or at the end of the polyamide polymerization. The polyhydric alcohol may be added at the end of the polyamide polymerization, especially as a molten stream just before emptying the polyamidation reactor. The homogeneity of the mixture of molten polyamide and of the polyhydric alcohol may be obtained by using a static mixer placed before the extrusion die of the polyamidation reactor.

The polyhydric alcohol may be added to the reaction medium in solid form, for example in the form of powder or flakes, in molten form, as a dispersion or in dissolved form in a suitable solvent, for instance water.

The polyamide of the invention may be used to make polyamide compositions that are generally obtained by mixing the various compounds, fillers and/or additives. The process is performed at more or less high temperature and at more or less high shear force, according to the nature of the various compounds. The compounds can be introduced simultaneously or successively. Use is generally made of an extrusion device in which the material is heated, then melted and subjected to a shear force, and conveyed. According to particular embodiments, it is possible to prepare preblends, optionally in the melt, before preparation of the final composition. It is possible, for example, to prepare a preblend in a resin, for example of the polyamide, so as to make a masterbatch.

The composition according to the invention may comprise one or more other polymers, preferably polyamides or copolyamides.

The composition according to the invention may comprise between 20% and 90% by weight, preferentially between 20% and 70% by weight and more preferentially between 35% and 65% by weight of polyamide according to the invention, obtained via the polymerization process as described previously, relative to the total weight of the composition.

The composition may also comprise reinforcing or bulking fillers. Reinforcing or bulking fillers are fillers conventionally used for the production of polyamide compositions. Mention may in particular be made of reinforcing fibrous fillers, such as glass fibers, carbon fibers or organic fibers, non-fibrous fillers such as particulate or lamellar fillers and/or exfoliable or non-exfoliable nanofillers, for instance alumina, carbon black, clays, zirconium phosphate, kaolin, calcium carbonate, copper, diatomaceous earths, graphite, mica, silica, titanium dioxide, zeolites, talc, wollastonite, polymeric fillers, such as, for example, dimethacrylate particles, glass beads or glass powder.

Preferably, reinforcing fibers, such as glass fibers, are in particular used. Preferentially, the fiber most widely used is glass fiber, of "chopped" type, having a diameter between 7 and 14 μm and a length of less than 5 mm. These fillers may have a surface size that ensures mechanical adhesion between the fibers and the polyamide matrix.

The composition according to the invention can comprise between 5% and 60% by weight of reinforcing or bulking fillers and preferentially between 10% and 40% by weight, relative to the total weight of the composition.

The composition according to the invention comprising the polyamide as defined above can comprise at least one impact modifier, that is to say a compound capable of modifying the impact strength of a polyamide composition. These impact modifiers preferentially comprise functional groups which react with the polyamide.

According to the invention, the term "functional groups which react with the polyamide" means groups capable of reacting or of interacting chemically with the acid or amine functions of the polyamide, in particular by covalency, ionic or hydrogen bond interaction or van der Waals bonding. Such reactive groups make it possible to ensure good dispersing of the impact modifiers in the polyamide matrix. Good dispersing is generally obtained with impact modifier particles having a mean size of between 0.1 and 2 µm in the matrix.

Use is preferentially made of impact modifiers comprising functional groups that react with the polyamide as a function of the acid or amine nature of the imbalance $\Delta EG=CEG-AEG$ (concentration of acid end groups CEG minus concentration of amine end groups AEG) of the polyamide. Thus, for example, if the $\Delta EG$ is "acid" (CEG>AEG), use will preferentially be made of reactive functional groups capable of reacting or of interacting chemically with the acid functions of the polyamide, in particular by covalency, ionic or hydrogen bond interaction or van der Waals bonding. If, for example, the $\Delta EG$ is "amine" (AEG>CEG), use will preferably be made of reactive functional groups capable of reacting or of interacting chemically with the amine functions of the polyamide, in particular by covalency, ionic or hydrogen bond interaction or van der Waals bonding. Use is preferentially made of impact modifiers having functional groups which react with the polyamide exhibiting a $\Delta EG$ of "amine" nature.

The impact modifiers can very well comprise in themselves functional groups which react with the polyamide, for example as regards ethylene/acrylic acid products (EAA).

It is also possible to add thereto functional groups which react with the polyamide, generally by grafting or copolymerization, for example for ethylene/propylene/diene (EPDM) grafted with maleic anhydride.

Use may be made, according to the invention, of impact modifiers which are oligomeric or polymeric compounds comprising at least one of the following monomers or a mixture thereof: ethylene, propylene, butene, isoprene, diene, acrylate, butadiene, styrene, octene, acrylonitrile, acrylic acid, methacrylic acid, vinyl acetate, vinyl esters, such as acrylic and methacrylic esters and glycidyl methacrylate. These compounds according to the invention can also comprise, in addition, monomers other than those mentioned above.

The base of the impact modifier compound, optionally known as elastomer base, can be selected from the group consisting of: polyethylenes, polypropylenes, polybutenes, polyisoprenes, ethylene-propylene rubbers (EPR), ethylene-propylene-diene (EPDM) rubbers, ethylene and butene rubbers, ethylene and acrylate rubbers, butadiene and styrene rubbers, butadiene and acrylate rubbers, ethylene and octene rubbers, butadiene acrylonitrile rubbers, ethylene-acrylic acid (EAA) products, ethylene-vinyl acetate (EVA) products, ethylene-acrylic ester (EAE) products, acrylonitrile-butadiene-styrene (ABS) copolymers, styrene-ethylene-butadiene-styrene (SEBS) block copolymers, styrene-butadiene-styrene (SBS) copolymers, core/shell elastomers of methacrylate-butadiene-styrene (MBS) type, or mixtures of at least two elastomers listed above.

In addition to the groups listed above, these impact modifiers can also comprise, generally grafted or copolymerized, functional groups which react with the polyamide, such as, in particular, the following functional groups: acids, such as carboxylic acids, salified acids, esters in particular, acrylates and methacrylates, ionomers, glycidyl groups, in particular epoxy groups, glycidyl esters, anhydrides, in particular maleic anhydrides, oxazolines, maleimides or their mixtures. Such functional groups on the elastomers are, for example, obtained by use of a comonomer during the preparation of the elastomer.

Mention may in particular be made, as impact modifiers comprising functional groups which react with the polyamide, of terpolymers of ethylene, acrylic ester and glycidyl methacrylate, copolymers of ethylene and of butyl ester acrylate, copolymers of ethylene, n-butyl acrylate and glycidyl methacrylate, copolymers of ethylene and of maleic anhydride, ethylene/propylene/diene copolymers grafted with maleic anhydride, styrene/maleimide copolymers grafted with maleic anhydride, styrene/ethylene/butylene/styrene copolymers modified with maleic anhydride, styrene/acrylonitrile copolymers grafted with maleic anhydrides, acrylonitrile/butadiene/styrene copolymers grafted with maleic anhydrides, and hydrogenated versions thereof.

The weight proportion of the impact modifiers in the total composition is especially between 3% and 25% and preferentially between 4% and 8% relative to the total weight of the composition.

The composition according to the invention may also comprise other additives participating in the heat and/or light stabilization of the composition, such as those chosen from the group comprising: the CuI and KI couple, hindered phenolic compounds, stabilizers bearing at least one hindered amine unit of HALS type, organic or mineral phosphorus-based stabilizers, such as sodium or manganese hypophosphite.

According to one variant, it comprises a CuI/KI content ranging from 0.1% to 1.5% by weight and especially from 0.5% to 1.2% by weight, relative to the total weight of the composition.

According to another variant, it comprises a limited or even zero content of stabilizer of CuI/KHalogen type.

The composition may also comprise a limited or even zero content of stabilizers of the type such as:
hindered phenols, and
bearing at least one hindered amine unit of HALS type.

The term "limited content" means a content of less than or equal to 0.5% by weight, especially 0.2% by weight, in particular 0.1% by weight or even 0.05% by weight relative to the total weight of the composition.

The composition according to the invention can also comprise additives normally used in the production of polyamide compositions. Thus, mention may be made of lubricants, flame retardants, plasticizers, nucleating agents, anti-UV agents, catalysts, antioxidants, antistatic agents, colorants, mattifying agents, molding aids or other conventional additives.

According to a particular embodiment, the composition also comprises at least one filler, especially a reinforcing filler, in particular as defined below, at least one flame retardant, in particular as defined below, and/or at least one additive, in particular as defined below, these compounds possibly being present in contents as presented in the description.

According to a variant, the compositions are free of flame retardant, and in particular of flame retardant of the triazine type.

These fillers and additives may be added to the modified polyamide by normal means suited to each filler or additive, for instance during the polymerization or by melt blending.

According to a particular embodiment, the polyhydric alcohol is used especially in a content ranging from 1% to 5% by weight in a composition comprising or even consisting of:

polyamide, especially in a content ranging from 20% to 90% by weight, optionally reinforcing and/or bulking fillers, especially in a content ranging from 5% to 60% by weight, optionally impact modifiers, especially in a content ranging from 3% to 25% by weight, optionally additives, especially in a content ranging from 0 to 15% by weight, the weight percentages being relative to the total weight of the composition.

The polyamide compositions are generally obtained by blending the various compounds participating in the composition under cold conditions or in the melt. The process is carried out at more or less high temperature and at more or less high shear force, according to the nature of the various compounds. The compounds can be introduced simultaneously or successively. Use is generally made of an extrusion device in which the material is heated, then melted and subjected to a shear force, and conveyed.

It is possible to blend all the compounds in the molten phase during a single operation, for example during an extrusion operation. It is possible, for example, to blend granules of the polymer materials, to introduce them into the extrusion device in order to melt them and to subject them to more or less high shearing. According to specific embodiments, it is possible to preblend some of the compounds, in the melt or not in the melt, before preparation of the final composition.

The composition according to the invention, when it is prepared using an extrusion device, is preferably conditioned in the form of granules. The granules are intended to be formed using processes involving melting in order to obtain articles. The articles are thus constituted of the composition. According to a normal embodiment, the modified polyamide is extruded in the form of rods, for example in a twin-screw extrusion device, which are then chopped into granules. The molded parts are subsequently prepared by melting the granules produced above and feeding the molten composition into forming devices, for example injection-molding devices.

The composition according to the invention can be used in any process for forming plastics, such as, for example, the molding process, in particular injection molding, extrusion, extrusion blow-molding or rotary molding. The extrusion process may especially be a spinning process or a process for manufacturing films.

The present invention also relates to the manufacture of articles of impregnated fabric type or composite articles containing continuous fibers. These articles may especially be manufactured by placing in contact a fabric and the polyamide composition according to the invention in the solid or molten state. Fabrics are textile surfaces obtained by assembling yarns or fibers which are rendered integral by any process, especially such as adhesive bonding, felting, braiding, weaving or knitting. These fabrics are also referred to as fibrous or filamentous networks, for example based on glass fiber, carbon fiber or the like. Their structure may be random, unidirectional (1D) or multidirectional (2D, 2.5D, 3D or other).

The present invention also relates to articles obtained by forming the composition according to the invention, for example by extrusion, molding, or injection molding. Mention may be made, as articles, of those used in the motor vehicle industry or the electronics and electrical industry, for example.

In particular, the articles comprise fillers, in particular reinforcing fillers, especially as defined in the present description.

The expression "articles made for applications exposed to high temperatures, especially temperatures of greater than or equal to 80° C." generally means articles manufactured to contain or transport fluids, i.e. liquids or gases, brought to high temperatures, for instance articles of the cooling circuit of a motor vehicle which are intended to keep the engine at an optimum and virtually constant temperature of about 100° C. These articles according to the present invention are thus defined by their applications which expose them to high temperatures; this involving their design, manufacture and intended uses based on this technical constraint in a usual mode of functioning.

According to another of its aspects, a subject of the invention is the use of articles in applications involving prolonged heating, and in particular involving prolonged contact with a hot liquid or fluid. This contact may be of the order of more than 500 or 1000 hours.

As articles subjected to high temperatures, examples that may be mentioned include the articles of the water/glycol cooling circuit, for example the radiator tank, the transfer pipe, the thermostatic tank, the degassing tank, the radiator, articles of the air circuit, for instance the turbo pipe, the air/air exchanger (intercooler), the air inlet or outlet box of the turbo cooler, the exhaust gas recycling circuit, the air intake collector and the associated pipework, the catalytic converter, the parts of the engine-fan group, the intermediate coolers, and the articles of the oil circuit, such as the cylinder head cover, the oil sump, the oil filtration unit, the distribution sump and the oil-transporting assembly pipework. These articles are well known in the field of engine-driven vehicles such as motor vehicles.

Specific terms are used in the description so as to facilitate understanding of the principle of the invention. Nevertheless, it should be understood that no limitation on the scope of the invention is envisioned by the use of these specific terms. The term "and/or" includes the meanings and, or and all the other possible combinations of the elements connected to this term.

Other details or advantages of the invention will become more clearly apparent in the light of the examples below, given solely by way of indication.

EXPERIMENTAL PART

Characterizations

Viscosity index as a solution in formic acid (IV in mL/g) according to standard ISO 307.

Acid end group (CEG) and amine end group (AEG) content: assayed by potentiometry, expressed in meq/kg.

Melting point (Mp) and associated enthalpy ($\Delta$Hf), and cooling crystallization temperature ($T_c$): determined by Differential Scanning calorimetry (DSC), using a Perkin Elmer Pyris 1 machine, at a rate of 10° C./min.

COMPARATIVE EXAMPLE 1

Preparation of a PA 66

150 g (0.572 mol) of N salt (1:1 salt of hexamethylenediamine and adipic acid), 136 g of deionized water and 2 g of an antifoam are placed in a polymerization reactor. The polyamide 66 is manufactured according to a standard process for polymerization of polyamide 66 type with 30 minutes of finishing at 272° C. The polymer obtained is cast in the form of rods, cooled, and formed into granules by cutting up the rods.

The polymer obtained has the following characteristics: CEG=85.7 meq/kg, AEG=43.7 meq/kg, and IV of 135 mL/g.

EXAMPLE 1

Preparation of a PA 66 in the Presence of DPE (Content of Target "DPE Structure" of 2.5% by Weight in the Final Polyamide)

150 g (0.572 mol) of N salt (1:1 salt of hexamethylenediamine and adipic acid), 3.6 g of 90% dipentaerythritol (DPE) supplied by Acros, comprising a mixture of 90% dipentaerythritol and 10% monopentaerythritol (MPE), i.e. 0.0127 mol of DPE and 0.0026 mol of MPE, 136.3 g of demineralized water and 2 g of an antifoam are placed in a polymerization reactor. The polyamide 66 polymerized in the presence of DPE is manufactured according to a standard process for polymerization of polyamide 66 type with 30 minutes of finishing at 272° C. The polymer obtained is cast in the form of rods, cooled, and formed into granules by cutting up the rods.

The polymer obtained presents the following characteristics: CEG=52.8 meq/kg, AEG=88.1 meq/kg. In comparison with the PA 66 synthesized without DPE, it therefore contains more amine end functions than carboxylic acid end functions, indicating that a grafting reaction has taken place bonding the DPE and MPE to the polyamide chains. The viscosity index is IV=104.6 mL/g. The polymer is semicrystalline and has the following thermal characteristics: Tc=224.5° C., Mp=261.8° C. (values identical to those of a polyamide 66).

The PA 66 polymerized in the presence of DPE has □EG=CEG−AEG=−35.3 meq./kg as opposed to □EG=CEG−AEG=42 meq./kg for a PA 66 polymerized without DPE, which indicates that the DPE (and MPE) has partially reacted via its hydroxyl functions with the acid functions of the adipic acid, to a proportion of 77.3 meq./kg. The amount of hydroxyl functions provided by the DPE is (6×0.0127+4×0.0026)×1000/((150×226.34/262.34+3.6)/1000)=651 meq/kg. The mole fraction of reacted hydroxyl functions of the DPE (and MPE) is equal to the ratio of the amount of reacted hydroxyl functions to the initial amount of hydroxyl functions in the DPE and MPE, i.e. 77.3/651=12%. If equal reactivity of the hydroxyl functions is considered, this means that on average 0.7 hydroxyl function per DPE has reacted and 0.5 hydroxyl function per MPE has reacted. On average, this means that 70 mol % of the DPE is bonded and that 50 mol % of the MPE is chemically bonded to the polyamide.

COMPARATIVE EXAMPLE 2

Preparation of a PA 66

80.0 kg (304.9 mol) of N salt, 72.8 kg of demineralized water and 5.5 g antifoam Silcolapse 5020® are added to a polymerization reactor. The polyamide is manufactured according to a standard process for polymerization of polyamide 66 type with 30 minutes of finishing at 275° C. The polymer obtained is cast in the form of rods, cooled, and formed into granules by cutting up the rods.

The polymer obtained has a viscosity index of 137.5 mL/g.

EXAMPLE 2

Preparation of a PA 66 in the Presence of DPE (Content of Target "DPE Structure" of 2% by Weight in the Final Polyamide)

80.0 kg (304.9 mol) of N salt, 1.38 kg (5.43 mol) of dipentaerythritol, 72.8 kg of demineralized water and 5.5 g antifoam Silcolapse 5020® are placed in a polymerization reactor. The modified polyamide DPE is manufactured according to a standard process for polymerization of polyamide 66 type with 30 minutes of finishing at 275° C. The polymer obtained is cast in the form of rods, cooled, and formed into granules by cutting up the rods. The granules have a shiny surface aspect.

The polymer obtained presents the following characteristics: CEG=54 meq/kg, AEG=79 meq/kg, and IV of 106.5 mL/g.

EXAMPLE 3

Preparation of a PA 66 in the Presence of DPE (Content of Target "DPE Structure" of 3% by Weight in the Final Polyamide)

80.0 kg (304.9 mol) of N salt, 2.07 kg (8.15 mol) of dipentaerythritol, 72.8 kg of demineralized water and 5.5 g antifoam Silcolapse 5020® are placed in a polymerization reactor. The modified polyamide DPE is manufactured according to a standard process for polymerization of polyamide 66 type with 30 minutes of finishing at 275° C. The polymer obtained is cast in the form of rods, cooled, and formed into granules by cutting up the rods. The granules have a shiny surface aspect.

The polymer obtained presents the following characteristics: CEG=44 meq/kg, AEG=96 meq/kg.

EXAMPLES 4 AND 5

Preparation of the Formulations

Before extrusion, the polyamide granules of examples 2 and 3 and comparative example 2 are dried to a water content below 1500 ppm. Formulations are prepared by melt-blending various components and additives in a twin-screw co-rotating Werner & Pfleiderer ZSK 40 extruder operating at 40 kg/h and at a speed of 270 rpm. The temperature settings in the 8 zones are respectively: 250, 255, 260, 260, 265, 270, 275, 280° C. All the components in the formulation are added at the start of the extruder. The rod having exited the extruder is cooled in a water tank and cut into the form of granules using a granulator and the granules are packaged in a heat-sealed bag. Before being injection molded, the granules are dried so as to obtain a moisture content of less than 1500 ppm.

The formulations obtained are as follows:
Comparative example C3: polyamide of comparative example C2+CuI/KI from AJAY Europe+glass fiber (OCV 983 from Owens Corning Vetrotex)
Comparative example C4: polyamide of comparative example C2+Dipentaerythritol from Perstorp "Dipenta", named DPE+glass fiber
Example 4: polyamide of example 2+glass fiber
Example 5: polyamide of example 3+glass fiber The formulations prepared are injected, on a Demag 50T press at 280° C. with a mold temperature of 80° C., in the form of multifunction test pieces 4 mm thick, in order to characterize the tensile mechanical properties (tensile modulus, ultimate stress, ultimate strain—mean obtained on 5 samples) according to the ISO 527/1A standard and the impact mechanical properties (unnotched Charpy—mean obtained on 10 samples) according to the ISO 179-1/1 eU standard at 23° C. before and after thermal aging in air.

The thermal aging ventilated in air is performed by placing the test pieces in a Heraeus TK62120 incubator regulated at 170° C. or 210° C. At various aging times, test pieces are removed from the incubator, cooled to room temperature and placed in heat-sealed bags in order to prevent them from taking up any moisture before evaluation of their mechanical properties.

The retention of ultimate tensile strength or of impact strength at a given aging time is then defined relative to these same properties before aging. The retention is thus defined as a percentage.

The formulations and properties are collated in table 1 below:

TABLE 1

|  | C3 | C4 | 4 | 5 |
|---|---|---|---|---|
| PA 66 (Example C2) (%) | 64.7 | 63.7 | — | — |
| PA 66/DPE (Example C2) (%) | — | — | 65.0 | — |
| PA 66/DPE (Example 3) (%) | — | — | — | 65.0 |
| Glass fiber OCV 983 (%) | 35.0 | 35.0 | 35.0 | 35.0 |
| DPE (%) | — | 1.3 | — | — |
| CuI/KI (%) | 0.04/0.26 | — | — | — |
| Before aging |  |  |  |  |
| Ultimate tensile strength (MPa) | 210.2 | 212.3 | 213.4 | 210.8 |
| Unnotched Charpy impact strength (kJ/m$^2$) | 90 | 81 | 65 | 50 |
| After aging for 500 h at 210° C. |  |  |  |  |
| Ultimate tensile strength (MPa) | 147.9 | 193.7 | 208.5 | nm |
| Unnotched Charpy impact strength (kJ/m$^2$) | 28 | 42 | 64 | nm |
| Retention of Ultimate tensile strength (%) | 70 | 91 | 98 | nm |
| Unnotched Charpy impact strength retention (%) | 31 | 52 | 98 | nm |
| After aging for 1000 h at 210° C. |  |  |  |  |
| Ultimate tensile strength (MPa) | 101 | 121 | 145 | nm |
| Unnotched Charpy impact strength (kJ/m$^2$) | 16 | 23 | 44 | nm |
| Ultimate tensile strength retention (%) | 48 | 57 | 68 | nm |
| Unnotched Charpy impact strength retention (%) | 18 | 28 | 68 | nm |
| After aging for 1000 h at 170° C. |  |  |  |  |
| Ultimate tensile strength (MPa) | 191.7 | nm | nm | 202.3 |
| Unnotched Charpy impact strength (kJ/m$^2$) | 41 | nm | nm | 44 |
| Ultimate tensile strength retention (%) | 90 | nm | nm | 96 |
| Unnotched Charpy impact strength retention (%) | 45 | nm | nm | 88 |

%: the percentages are expressed on a weight basis
nm = not measured

It is thus clearly observed that the presence of DPE makes it possible to improve the impact strength retention and the ultimate tensile strength after aging at 210° C. in a ventilated oven, relative to the CuI/KI mixture. This is the desired effect. On the other hand, it is observed, entirely surprisingly, that the introduction of DPE during the polymerization gives rise to greater retention of both the tensile mechanical properties and the impact mechanical properties than when it is introduced at the time of extrusion.

In addition, the resistance to aging is also improved at 170° C. by introducing the DPE during the polymerization, relative to the CuI/KI mixture.

EXAMPLE 6

Preparation of Formulations for Industrial Yarns

Before extrusion, the polyamide granules of comparative example 2 are dried to a water content below 1500 ppm. The formulation is prepared by melt-blending the additive in a twin-screw co-rotating Werner & Pfleiderer ZSK 40 extruder operating at 40 kg/h and at a speed of 270 rpm. The temperature settings in the 8 zones are, respectively: 250, 255, 260, 260, 265, 270, 275, 280° C. All the components in the formulation are added at the start of the extruder. The rod having exited the extruder is cooled in a water tank and cut into the form of granules using a granulator and the granules are packaged in a heat-sealed bag.

The formulation obtained is as follows:

Comparative example C5: polyamide of comparative example C2+

Dipentaerythritol from Perstorp "Di-penta", named DPE

The granules have a matt surface aspect.

Examples 2 and C5 are postcondensed in solid form in a fixed bed under a stream of nitrogen at 190° C. to increase their viscosity index before extrusion.

The extrusion of the batches is performed at 1 kg/h on a single-screw extruder 18 mm in diameter, for which the temperature settings in the 5 zones are, respectively: 280, 290, 295, 295, 300° C. The extrusion pack is equipped with a woven 10 μm metallic filter 48 mm in diameter and a die with 14 holes of 0.33*4D, whose nominal temperature is set at 293° C. for example 2 and 285° C. for comparative example C5. The extrusion is performed at 450 m/min on a Barmag SW4 winder with 1% Delion F5103 on yarn as size.

The examples and properties are collated in table 2 below:

TABLE 2

|  | C5 | 6 |
|---|---|---|
| PA 66 (Example C2) (%) | 98 | — |
| PA 66/DPE (Example 2) (%) | — | 100 |
| DPE (%) | 2 | — |
| Postcondensation solid (PCS) |  |  |
| Time at 190° C. (h) | 5.5 | 8 |
| IV (mL/g) | 189 | 181 |
| Granule aspect | Pronounced exudation | Shiny |
| Extrusion |  |  |
| Pressure increase of the extrusion packs (b/min) | 1.0 | No increase |

Thus, after postcondensation, the granules of example C5 have a very matt surface aspect due to exudation amplified by the postcondensation. The exudate, analyzed by $^1$H NMR, is DPE. After postcondensation, the granules of example 2 still have a shiny surface aspect. The use of the additive according to the present invention thus prevents the deleterious effects of exudation of said additive: especially the fouling of the equipment and the loss of additive.

In addition, the polymer of example C5 rapidly clogs the filter of the extrusion pack, to the point that the test must be stopped prematurely. On the other hand, the polymer of the present invention presents no difficulties on extrusion.

EXAMPLE 7

Preparation of a PA 66 Functionalized with Tromethamine 150 g (0.572 mol) of N salt (1:1 salt of hexamethylenediamine and adipic acid), 2.49 g (0.017 mol) of tromethamine (THAM) supplied by Sigma-Aldridge, 1.236 g (0.0085 mol) of adipic acid, 136.3 g of demineralized water and 2 g of an antifoam are placed in a polymerization reactor. The polyamide 66 polymerized in the presence of THAM is manufactured according to a standard process for polymerization of polyamide 66 type with 5 minutes of finishing at 272° C. The polymer obtained is cast in the form of rods, cooled, and formed into granules by cutting up the rods.

The polymer obtained presents the following characteristics: AEG=140.6 meq./kg, CEG=131.1 meq./kg. The polymer is semicrystalline and has the following thermal characteristics: Tc=215.5° C., Mp=259.7° C. (values identical to those of a polyamide 66).

PA 66 polymerized in the presence of THAM has ☐EG=CEG−AEG=−9.5 meq./kg as opposed to ☐EG=CEG−AEG=42 meq./kg for a PA 66 polymerized without THAM, which indicates that the THAM has reacted chemically.

EXAMPLE 8

Preparation of a PA 66 in the Presence of Dipentaerythritol or DPE (Content of Target "DPE Structure" of 3% by Weight in the Final Polyamide)

150 g (0.572 mol) of N salt (1:1 salt of hexamethylenediamine and adipic acid), 4.0 g (0.016 mol) of dipentaerythritol, 1.1 g (0.008 mol, i.e. 117 meq./kg of polyamide) of adipic acid, 136.3 g of demineralized water and 2 g of an antifoam are placed in a polymerization reactor. The polyamide 66 polymerized in the presence of DPE is manufactured according to a standard process for polymerization of polyamide 66 type with 30 minutes of finishing at 272° C. The polymer obtained is cast in the form of rods, cooled, and formed into granules by cutting up the rods.

The polymer obtained presents the following characteristics: CEG=80.2 meq/kg, AEG=55.8 meq/kg. PA 66 polymerized in the presence of DPE has ☐EG=CEG−AEG=24.4 meq./kg. The PA 66 of comparative example 1, polymerized without DPE or compensation with adipic acid has ☐EG=CEG−AEG=42 meq./kg, which indicates that the polyhydric alcohol has partially reacted via its hydroxyl functions with the acid functions of the adipic acid, to a proportion of 117+42−24.4=135 meq./kg. Similarly to the calculation of example 1, the mean mole fraction of reacted hydroxyl functions of the polyhydric alcohol is 135/721=19%. If equal reactivity of the hydroxyl functions is considered, this means that on average 1.1 hydroxyl functions per DPE have reacted and 0.7 hydroxyl function per MPE has reacted. On average, this means that all of the DPE is bonded and that 70 mol % of the MPE is chemically bonded to the polyamide.

EXAMPLE 9

Preparation of a PA 66 in the Presence of Tripentaerythritol or TPE (Content of Target "TPE Structure" of 3% by Weight in the Final Polyamide)

150 g (0.572 mol) of N salt (1:1 salt of hexamethylenediamine and adipic acid), 4.0 g (0.011 mol) of tripentaerythritol, 0.8 g (0.005 mol, i.e. 80 meq./kg of PA) of adipic acid, 136.3 g of demineralized water and 2 g of an antifoam are placed in a polymerization reactor. The polyamide 66 polymerized in the presence of tripentaerythritol (TPE, Aldrich) is manufactured according to a standard process for polymerization of polyamide 66 type with 30 minutes of finishing at 272° C. The polymer obtained is cast in the form of rods, cooled, and formed into granules by cutting up the rods.

The polymer obtained presents the following characteristics: CEG=76.1 meq/kg, AEG=60.4 meq/kg. PA 66 polymerized in the presence of TPE has ΔEG=CEG−AEG=15.7 meq./kg. The PA 66 of comparative example 1, polymerized without TPE or compensation with adipic acid has ΔEG=CEG−AEG=42 meq./kg, which indicates that the polyhydric alcohol has partially reacted via its hydroxyl functions with the acid functions of the adipic acid, to a proportion of 80+42−15.7=107 meq./kg. Similarly to the calculation of example 1, the mean mole fraction of reacted hydroxyl functions of the polyhydric alcohol is 107/642=17%. If equal reactivity of the hydroxyl functions is considered, this means that on average 1.3 hydroxyl functions per TPE have reacted. On average, this means that all of the TPE is chemically bonded to the polyamide.

The invention claimed is:

1. A process for making a modified polyamide used in articles made for applications exposed to temperatures of greater than or equal to 80° C., comprising:
   polymerizing polyamide precursors in a polymerization reactor to form a polyamide; and
   adding, before or during the polymerization, a polyhydric alcohol selected from the group consisting of tripentaerythritol, tris(hydroxymethyl)aminomethane and/or a salt thereof, to the precursors and/or polyamide in the polymerization reactor,
   wherein, compared to a polyamide made by an analogous process wherein the polyhydric alcohol is added after polymerizing the polyamide precursors, the modified polyamide exhibits improved retention of tensile strength and of impact strength after ageing for 1000 hours at 170° C.; and
   wherein a mole proportion of the added polyhydric alcohol that is covalently bonded to the polyamide is between 10% and 100%.

2. The process of claim 1, characterized in that the hydroxyl groups of the polyhydric alcohol are borne by aliphatic carbons of the polyhydric alcohol.

3. The process of claim 1, wherein the amount of polyhydric alcohol added before or during the polymerization is from 0.05% to 20% by weight of polyhydric alcohol relative to the total weight of the polyamide and/or precursors thereof.

4. The process of claim 1, wherein the amount of polyhydric alcohol added before or during the polymerization is from 0.05% to 20% by weight of polyhydric alcohol relative to the total weight of the composition.

5. The process of claim 1, wherein the polyamide is a semicrystalline polyamide with an apparent melt viscosity of the polyamide of between 0.5 and 1200 Pa·s, measured according to standard ISO 11443 at a shear rate of 1000 s$^{-1}$ at a temperature equal to 20° C. above the melting point of the polyamide.

6. The process of claim 1, further comprising: forming the article; and
   using the article at temperatures of greater than or equal to 80° C.

\* \* \* \* \*